United States Patent
Morello (10) Patent No.: US 10,982,779 B2
(45) Date of Patent: Apr. 20, 2021

(54) VALVE

(71) Applicant: Enzo Morello, Concorezzo (IT)

(72) Inventor: Enzo Morello, Concorezzo (IT)

( * ) Notice: Subject to any disclaimer, the term of this patent is extended or adjusted under 35 U.S.C. 154(b) by 42 days.

(21) Appl. No.: 16/321,339

(22) PCT Filed: Aug. 2, 2017

(86) PCT No.: PCT/IB2017/054735
§ 371 (c)(1),
(2) Date: Jan. 28, 2019

(87) PCT Pub. No.: WO2018/025205
PCT Pub. Date: Feb. 8, 2018

(65) Prior Publication Data
US 2019/0170262 A1 Jun. 6, 2019

(30) Foreign Application Priority Data

Aug. 3, 2016 (IT) .................. 102016000081134

(51) Int. Cl.
*F16K 5/20* (2006.01)
*F16K 5/06* (2006.01)

(52) U.S. Cl.
CPC ............ *F16K 5/201* (2013.01); *F16K 5/0673* (2013.01); *F16K 5/0678* (2013.01); *F16K 5/0689* (2013.01); *F16K 5/205* (2013.01)

(58) Field of Classification Search
CPC ........ F16K 5/201; F16K 5/0678; F16K 5/208; F16K 5/188; F16K 5/168
USPC ........................................ 251/170, 172, 159
See application file for complete search history.

(56) References Cited

U.S. PATENT DOCUMENTS

| 5,533,738 | A | 7/1996 | Hoffmann |
| 7,690,626 | B2* | 4/2010 | Stunkard ............... F16K 5/0642 251/174 |
| 8,979,068 | B2* | 3/2015 | Yeary ..................... F16K 5/205 251/172 |
| 2014/0231690 | A1 | 8/2014 | Vincent et al. |
| 2016/0186870 | A1* | 6/2016 | Ricard .................... F16K 5/205 251/180 |

FOREIGN PATENT DOCUMENTS

JP 2002257246 A 9/2002
WO 2013/066187 A1 5/2013

* cited by examiner

*Primary Examiner* — Michael R Reid
(74) *Attorney, Agent, or Firm* — David B. Tingey; Bryant J. Keller; Kirton McConkie (57) ABSTRACT

Valve comprising a valve body having an upstream conduit for the inflow of a fluid and a downstream conduit for the outflow of a fluid, said conduits being substantially aligned along a longitudinal axis (X-X), a rotative ball controlling the fluid passage and having a cavity with axis perpendicular to its rotating axis (Y-Y), a first upstream seat operating in conjunction with said upstream conduit and said rotative ball, a first downstream seat operating in conjunction with said downstream conduit and said rotative ball, a second downstream seat axially arranged between said first downstream seat and said downstream conduit, and an intermediate element axially arranged between said first downstream seat and said second downstream seat and axially moveable between said first downstream seat and said second downstream seat.

12 Claims, 7 Drawing Sheets

VALVE

TECHNICAL FIELD

The present invention relates to a ball valve for the interception of fluids, in particular a ball valve having a seat with soft seal gasket and seal lips.

BACKGROUND ART

Ball valves generally comprise a valve body that can be coupled to line pipes through an upstream conduit for the inflow of fluid and a downstream conduit for the outflow of fluid, a rotative ball for controlling the flow of fluid with cavity, the latter being coaxial to the direction of flow in the open position and transversal to the direction of flow in the closed position, and wherein the seal between the ball and the conduits is made by means of an upstream seat and a downstream seat interposed between the ball and the valve body.

The aforementioned valves generally have the following types of configurations: single-piston effect (SPE-SPE), double-piston effect (DPE-DPE), combined (SPE-DPE).

In the SPE configuration with the valve closed, the seats and their seals are shaped in such a way that, whenever the pressure of the fluid comes from upstream (or downstream), the resulting pressure keeps the seats pushed against the ball, ensuring the seal. Otherwise, if the fluid pressure acts from the inside of the cavity, the resulting pressure force pushes the seats towards the valve body conduits allowing the self-release of overpressures in the line.

In DPE configuration, with valve closed, the seats and the relative seals are shaped in such a way that, whenever the pressure of the fluid comes from upstream (or downstream) or acts from inside the ball, the resulting pressure force always pushes the seats towards the ball. Any overpressures inside the ball cavity are managed by appropriate release valves. The DPE configuration allows an additional seal in case of breakage of one of the two seats avoiding the fluid flowing onto the line.

In the SPE-DPE combined configuration, the upstream SPE seat ensures self-release, while the downstream DPE seat acts as a double barrier in the event of damage to the upstream seat. This configuration provides for a preferred direction of installation with the SPE seat facing upstream.

In the presence of corrosive fluids, it is normal to use mono-directional seal lips made up of elastic materials energized by springs in the seats. In particular, such seals are generally made up of high performance polymers, e.g., filled Polytetrafluoroethylene (PTFE) liners, ketone ether polyether (PEEK) additives and Nickel-Chromium-Cobalt (NiCrCo) alloy springs.

It is well known that in high or very high pressure and/or temperature applications (e.g., pressures ANSI 2500=450 bar–API 10000/15000=690/1035 bar–Tmax=200/210° C.), one-way seal lips, when used in pairs (e.g., in the so-called back-to-back configuration), undergo mechanical loads such as to reach, with the passing of time, a permanent deformation of the seal itself which prevents its correct operation.

WO 2013/066187 A1, for example, has proposed to solve the problem of permanent deformations of the PEEK/PTFE seal lips by means of a movable intermediate element placed between two seals. Although this solution permits extending the working life of the seal lips, such configuration nonetheless has the drawback of necessarily having to shape the valve body following the conformation of the intermediate element which translates into an increase in overall production costs to reach a perfect coupling between seat, intermediate element and valve body.

From the foregoing, the need emerges to have a valve that can be altogether made in a simpler and faster way, keeping production costs low without negatively affecting the mechanical and sealing characteristics of the valve itself.

DESCRIPTION OF THE INVENTION

One object of the present invention is therefore to provide a valve having structural and functional characteristics such as to satisfy the aforementioned needs and at the same time overcome the drawbacks spoken about with reference to prior art.

This object is achieved by a valve in accordance with claim 1.

BRIEF DESCRIPTION OF THE DRAWINGS

Other characteristics and advantages of the present invention will become more evident from the following detailed description of one of its preferred embodiments, this description being presented merely as a non-exemplifying description and given with reference to the accompanying drawings, in which.

EMBODIMENTS OF THE INVENTION

Figure 1:
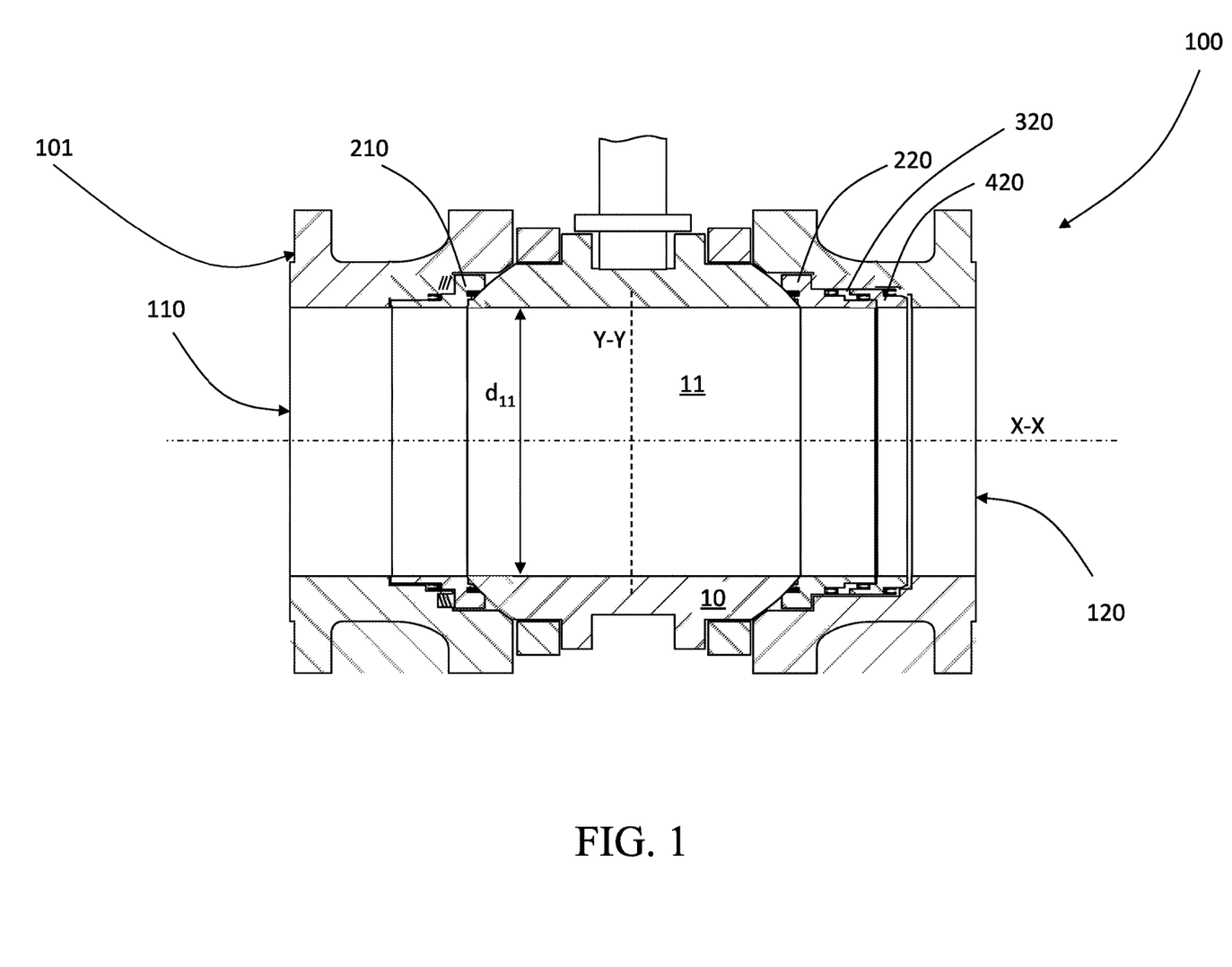
FIG. 1 is a longitudinal sectional view of a valve according to the invention.

In FIG. 1, a valve according to the present invention is indicated by numeral reference 100.

The valve 100 comprises a valve body 101 which can be coupled to a line pipe (not shown) having an upstream conduit 110 for the inflow of fluid, and a downstream conduit 120 for the outflow of fluid. Line pipes are commonly used to convey fluids without dispersion, e.g., gas, water, crude oil and their derivatives. Preferably, the conduits 110, 120 are aligned along a longitudinal axis indicated by the reference X-X.

The valve 100 comprises a rotative ball 10 rotating around its own rotating axis Y-Y perpendicular to the X-X axis. The purpose of the rotative ball 10 is to control the flow of fluid through a cavity 11 having an axis perpendicular to its own Y-Y rotating axis.

In the example shown in FIG. 1, the rotative ball 10 is of the "side entry" type with insertion from the side. Alternatively, the rotative ball 10 can be of the "top entry" type with insertion from the top.

Preferably, the rotative ball 10 consists at least partially of material selected in the group comprising: steel, nickel-chromium steel, coated steel, uncoated steel, duplex, Inconel®.

In the rest of the present description and in the subsequent claims, the measurements of the individual elements of the valve refer preferably to a 16" valve. When referring to a valve of different size, the measurements of the individual elements vary proportionally.

Preferably, the cavity 11 has a diameter $d_{11}$ of between 200 mm and 600 mm, preferably 400 mm.

The rotative ball 10 can be rotated between an opening position, wherein the cavity 11 is coaxial to the direction of the flow, and a closing position wherein the cavity is transverse to the direction of flow so that the walls of the ball interrupt the flow. The hydraulic seal between the rotative ball 10 and the conduits 110, 120 is made by means of a first upstream seat 210 and a first downstream seat 220 interposed between the rotative ball 10 and the valve body 101.

The first upstream seat 210 and the first downstream seat 220 are adapted to cooperate with the rotative ball 10 according to a plurality of configurations. Preferably, in the example shown in FIG. 1, the first upstream seat 210 has a single-acting piston (SPE) configuration with a soft seal gasket and a seal lip. In the present description and the subsequent claims, the terms "radially internal" and "radially external" are used to indicate a nearer and farther away position, respectively, along a radial direction with respect to the longitudinal axis X-X of the valve.

Figure 4:
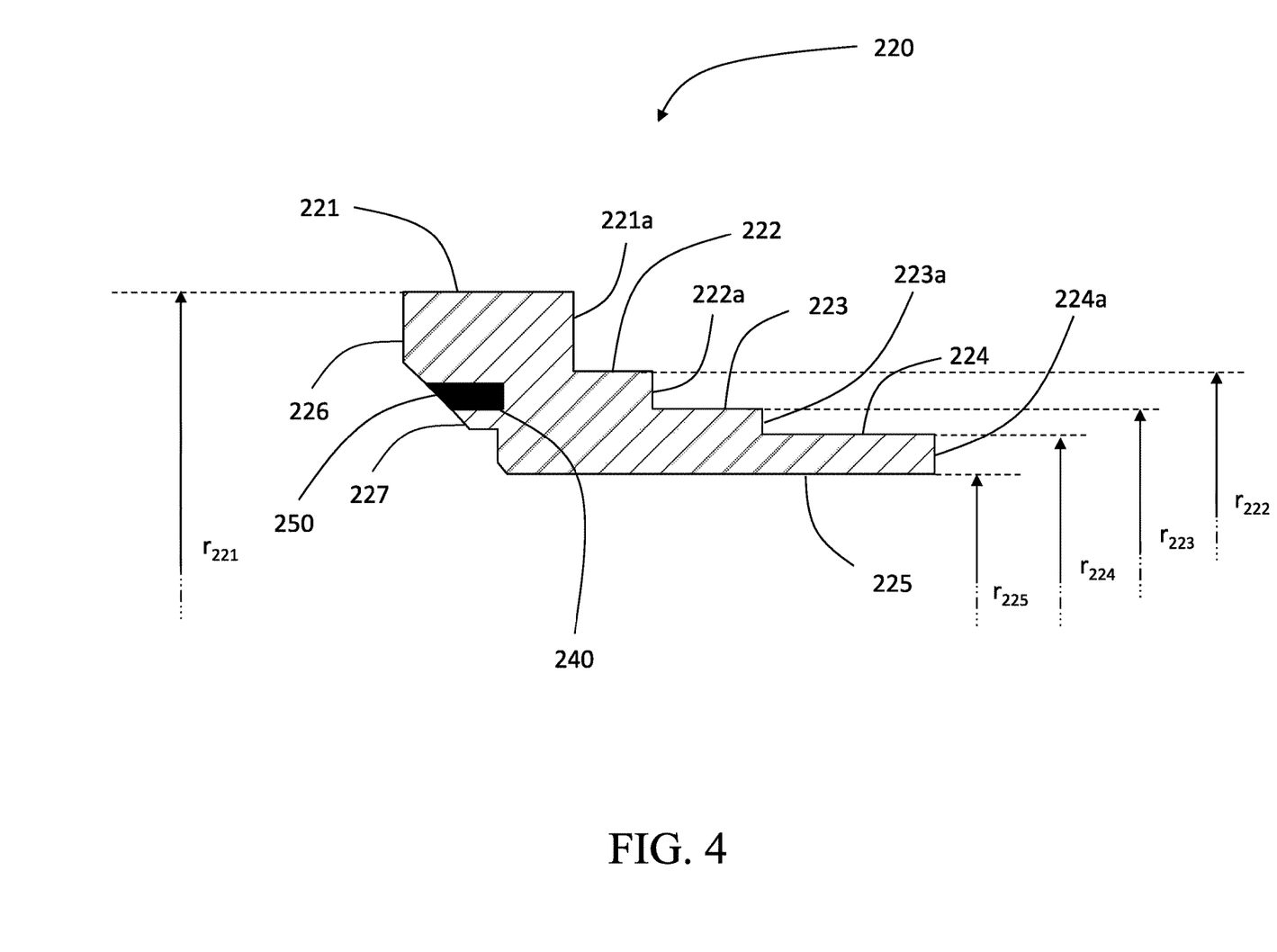
FIG. 4 is an enlarged longitudinal section view of the first downstream seat.
Figure 7:
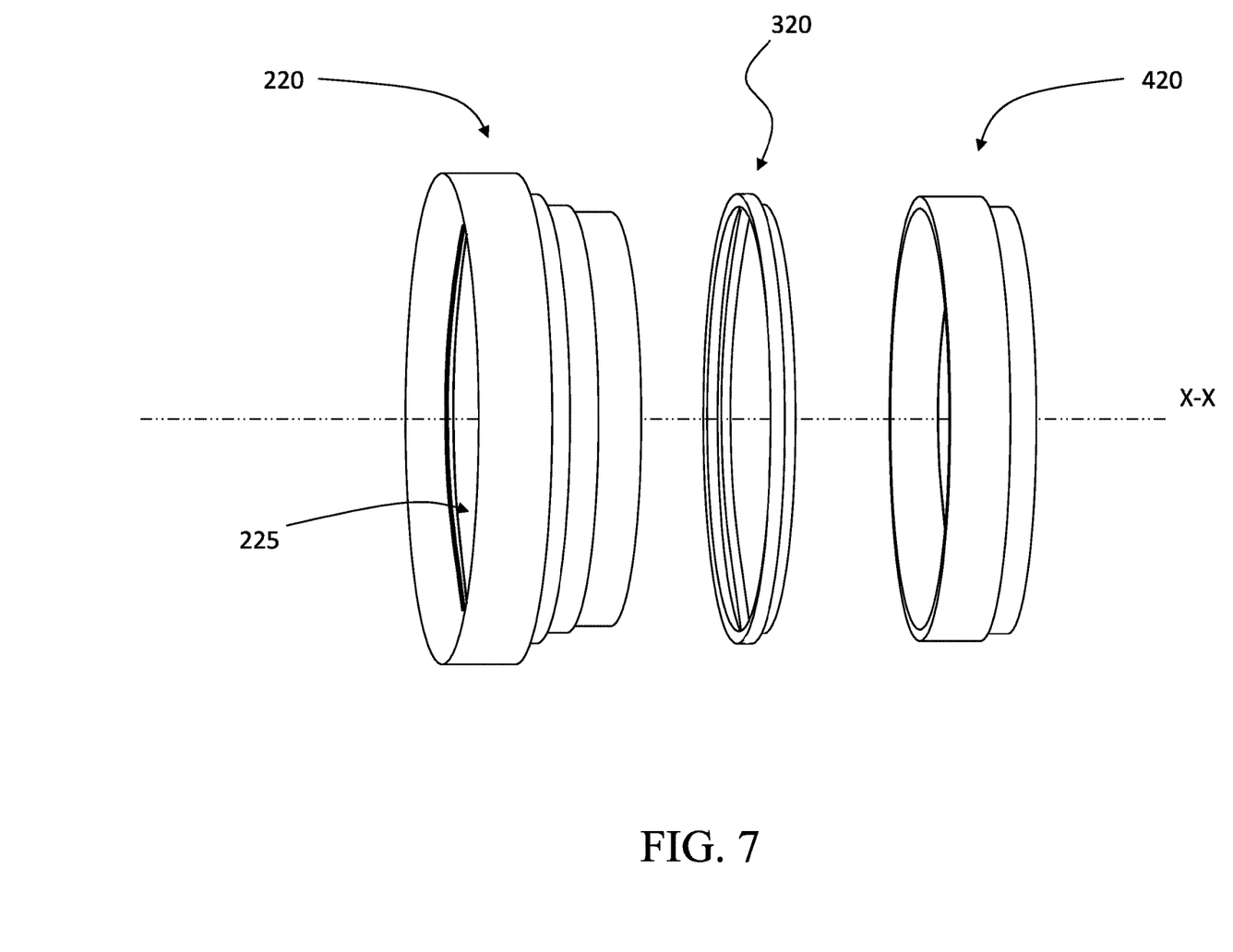
FIG. 7 is an exploded perspective view of the first downstream seat, the intermediate element and the second downstream seat.

With reference to FIGS. 4 and 7, the first downstream seat 220 is preferably shaped like a ring and has an internal surface 225 extending axially around a radius $r_{225}$ with length substantially corresponding to the radius (corresponding to half of the diameter $d_{11}$) of the cavity 11 of the rotative ball 10. This way, advantageously, the internal surface 225 of the first downstream seat 220 and the internal surface of the cavity 11 are substantially aligned when the rotative ball 10 is in the open position.

Preferably, the first downstream seat 220 is step tapered towards the downstream conduit 120. In particular, the first downstream seat 220 is shaped so as to show a plurality of external surfaces 221,222,223,224 (preferably in a number equal to four) extending according to a radial arrangement which is gradually reduced towards the downstream conduit 120.

As shown in the example in FIG. 4, the external surfaces 221,222,223,224 each extend around an own radius $r_{221}$, $r_{222}$,$r_{223}$,$r_{224}$. In particular, the first surface 221 is extended in radially external position with respect to the second surface 222, the latter being extended in radially external position with respect to the third surface 223. Finally, the fourth surface 224 is extended in radially internal position with respect to the third surface 223.

Preferably, the external surfaces 221,222,223,224 each have a radius between 100 mm and 300 mm. In particular, the first surface 221 has a preferred radius $r_{221}$ of 248 mm; the second surface 222 has a preferred radius $r_{222}$ of 222.5 mm; the third surface 223 has a preferred radius $r_{223}$ of 213 mm; the fourth surface 224 has a preferred radius $r_{224}$ of 207 mm.

Preferably, the first surface 221 extends for a 50 mm long stretch, the second surface 222 extends for a 20 mm long stretch, the third surface 223 extends for a 32 mm long stretch and the fourth surface 224 extends for a 48 mm long stretch. The first surface 221 and the fifth surface 225 of the first downstream seat 220 are connected together by a lateral surface comprising a vertical portion 226 extending substantially along the Y-Y direction and a curved portion 227. Preferably, the curved portion 227 has a surface meant to make contact, at least partially, by coupling of shape, with part of the external surface of the rotative ball 10. In particular, the first downstream seat 220 has a seat 240 obtained in the curved surface 227 to house a gasket 250 performing the function of a hydraulic seal between the first downstream seat 220 and the rotative ball 10 of the valve. Preferably, the gasket 250 can be of the soft or rigid type. It can consist, at least partially, of filled Polytetrafluoroethylene, ketone ether polyether or Kel-f®.

Always with reference to the example shown in FIG. 4, the first surface 221 and the second surface 222 of the first downstream seat 220 are connected by a first lateral surface 221a extending along the Y-Y vertical direction. Preferably, the first lateral surface 221a extends for a 25 mm long stretch. The second surface 222 and the third surface 223 are connected by a second lateral surface 222a extending along the Y-Y vertical direction. Preferably, the second lateral surface 222a extends for a 9.5 mm long stretch. The third surface 223 and the fourth surface 224 are connected by a third lateral surface 223a extending along the Y-Y vertical direction. Preferably, the third lateral surface 223a extends for a 6 mm long stretch. Finally, the fourth surface 224 and the fifth surface 225 are connected by a fourth lateral surface 224a extending along the Y-Y vertical direction. Preferably, the fourth lateral surface 224a extends for a 7 mm long stretch.

Advantageously, the valve 100 comprises a second downstream seat 420 arranged axially between the first downstream seat 220 and the downstream conduit 120. The second downstream seat 420 is axially moveable between the downstream conduit 120 and the intermediate element 320 as specified in detail in the rest of the present description.

Figure 6:
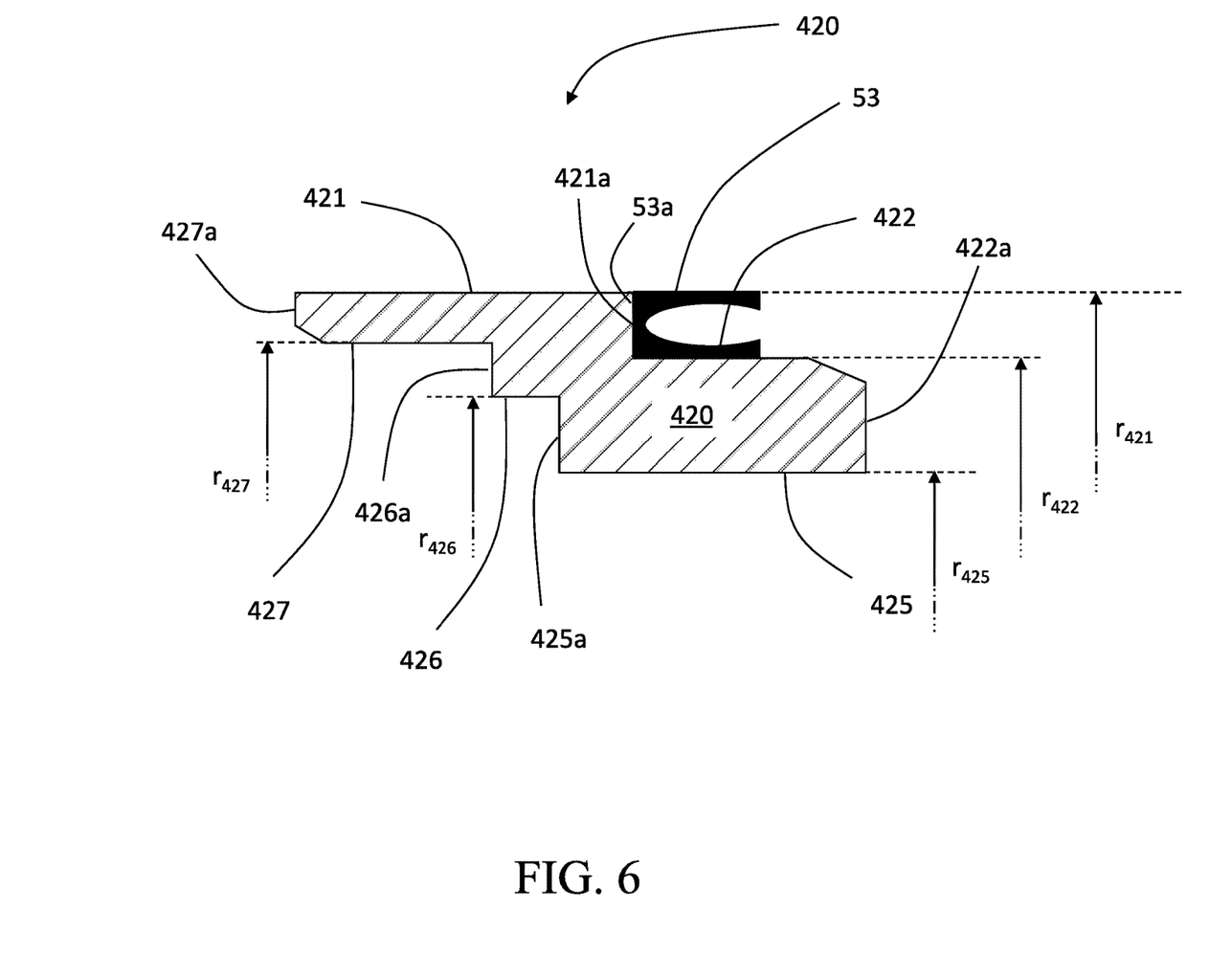
FIG. 6 is an enlarged longitudinal section view of the second downstream seat.

The second downstream seat 420 is internally shaped so as to have a first internal surface 425, a second internal surface 426 and a third internal surface 427 each extending around a radius of its own $r_{425}$,$r_{426}$,$r_{427}$ respectively.

As shown in the example of FIG. 6, the first internal surface 425 extends in a radially internal position with respect to the second internal surface 426. The third internal surface 427 extends in a radially external position with respect to the second internal surface 426. Preferably, the internal surface 425 extends axially around a radius $r_{425}$ substantially corresponding to the radius $r_{11}$ of the cavity 11 of the rotative ball 10. This way, the internal surface 225 of the first downstream seat 220, the internal surface of the cavity 11 and the internal surface 425 of the second downstream seat 420 are substantially aligned when the rotative ball 10 is in open position.

Preferably, the internal surfaces 426,427 each have a radius between 100 mm and 300 mm. In particular, the second internal surface 426 has a preferred radius $r_{426}$ of 207 mm; the third internal surface 427 has a preferred radius $r_{427}$ of 216.5 mm.

Preferably, the first internal surface 425 extends for a 40 mm long stretch, the second internal surface 426 extends for an 8 mm long stretch and the third internal surface 427 extends for a 34 mm long stretch.

The second downstream seat 420 is externally shaped so as to have a first external surface 421 and a second external surface 422 each extending around an own radius $r_{421}$,$r_{422}$. The second external surface 422 extends in a radially internal position with respect to the first surface 421.

Preferably, the external surfaces 421,422 each have a radius between 100 mm and 300 mm. In particular, the first external surface 421 has a preferred radius $r_{421}$ of 222.5 mm; the second external surface 422 has a preferred radius $r_{422}$ of 213 mm.

Preferably, the first external surface 421 extends for a 48 mm long stretch and the second external surface 422 extends for a 34 mm long stretch.

Advantageously, the first surface 421 is positioned in a radial position substantially corresponding to the radial position of the second external surface 222 of the first downstream seat 220. In point of fact, the first external surface 421 of the second downstream seat 420 and the second external surface 222 of the first downstream seat 220 are substantially aligned and extend around a same radius.

With reference to the example shown in FIG. 6, the first external surface 421 and the second external surface 422 of the second downstream seat 420 are connected by a first lateral surface 221a extending along the Y-Y vertical direction. Preferably, the first lateral surface 421a extends for a 9.5 mm long stretch. The second external surface 422 and the first internal surface 425 are connected by a second lateral surface 422a extending along the Y-Y vertical direction. Preferably, the second lateral surface 422a extends for a 13 mm long stretch.

The first internal surface 425 and the second internal surface 426 are connected by a third lateral surface 425a extending along the Y-Y vertical direction. Preferably, the third lateral surface 425a extends for a 9.5 mm long stretch. The second internal surface 426 and the third internal surface 427 are connected by a fourth lateral surface 426a extending along the Y-Y vertical direction. Preferably, the fourth lateral surface 426a extends for a 7 mm long stretch. The third internal surface 427 and the first external surface 421 are connected by a fifth lateral surface 427a extending along the Y-Y vertical direction. Preferably, the fifth lateral surface 427a extends for a 6 mm long stretch.

Advantageously, the valve 100 comprises an intermediate element 320 arranged axially between the first downstream seat 220 and the second downstream seat 420. The intermediate element 320 is axially moveable between the first downstream seat 220 and the second downstream seat 420 as specified in detail in the rest of the present description.

Figure 5:
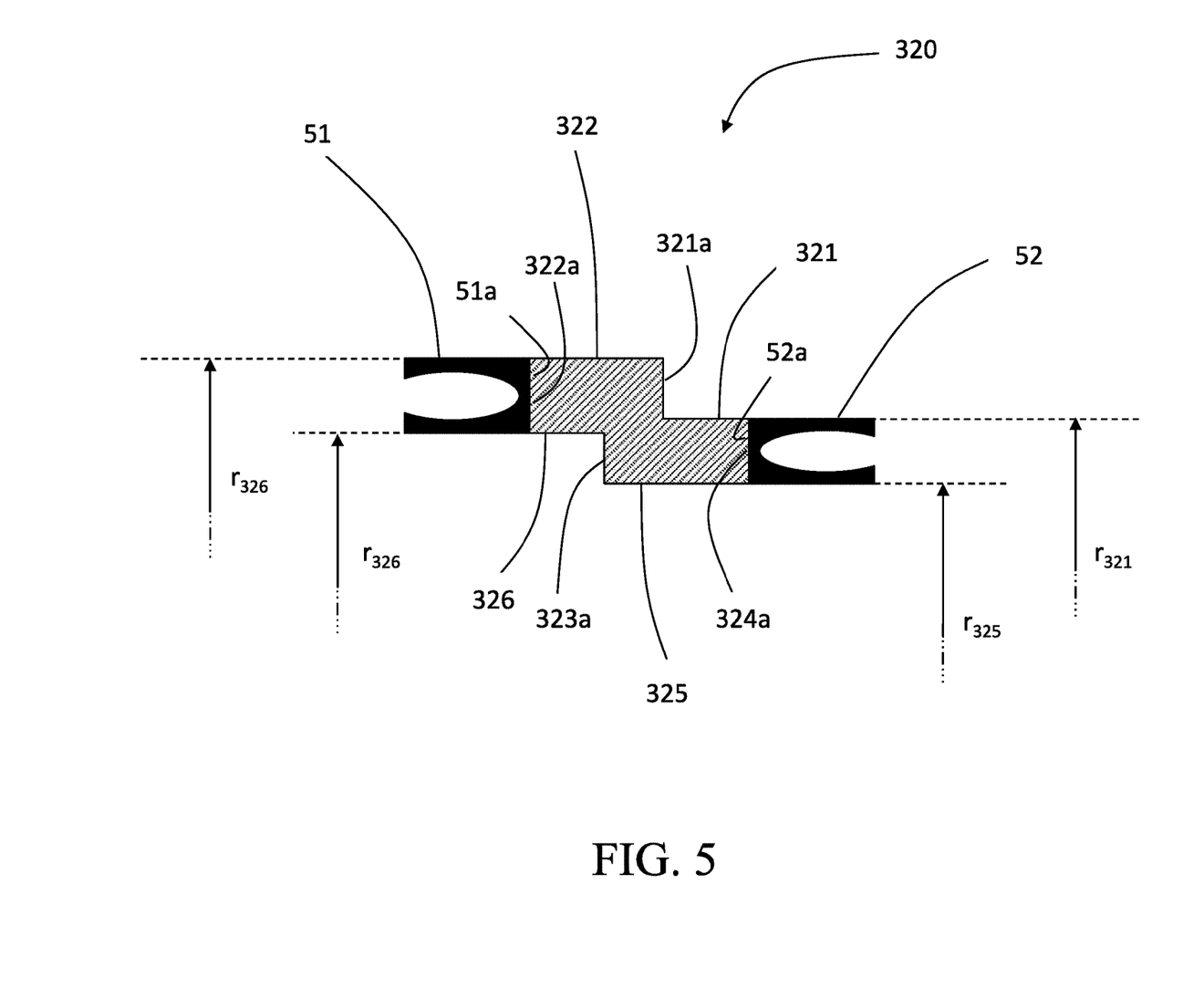
FIG. 5 is an enlarged longitudinal section view of the intermediate element.

As shown in the example of FIG. 5, the intermediate element 320 is internally shaped so as to have a first internal surface 325 and a second internal surface 326 each extending around a radius $r_{325}, r_{326}$ respectively. The first internal surface 325 extends in a radially internal position with respect to the second internal surface 326.

Preferably, the internal surfaces 325,326 each have a radius between 100 mm and 300 mm. In particular, the first internal surface 325 has a preferred radius $r_{325}$ of 207 mm; the second internal surface 326 has a preferred radius $r_{326}$ of 213 mm.

Preferably, the first internal surface 325 extends for an 11 mm long stretch and the second internal surface 326 extends for a 5 mm long stretch.

Advantageously, the intermediate element 320 is externally shaped so as to have a first external surface 321 and a second external surface 322 each extending around an own radius $r_{321}, r_{322}$. The second external surface 322 extends in a radially external position with respect to the first surface 321.

Preferably, the external surfaces 321,322 each have a radius between 100 mm and 300 mm. In particular, the first external surface 321 has a preferred radius $r_{321}$ of 216.5 mm; the second external surface 322 has a preferred radius $r_{322}$ of 222.5 mm.

Preferably, the first external surface 321 extends for a 6 mm long stretch and the second external surface 322 extends for a 10 mm long stretch.

With reference to the example shown in FIG. 5, the first external surface 321 and the second external surface 322 of the intermediate element 320 are connected by a first lateral surface 321a extending along a Y-Y vertical direction. Preferably, the first lateral surface 321a extends for a 6 mm long stretch. The second external surface 322 and the second internal surface 326 are connected by a second lateral surface 322a extending along the Y-Y vertical direction. Preferably, the second lateral surface 322a extends for a 7 mm long stretch. The second internal surface 326 and the first internal surface 325 are connected by a third lateral surface 323a extending along the Y-Y vertical direction. Preferably, the third lateral surface 323a extends for a 6 mm long stretch. Finally, the first internal surface 325 and the first external surface 321 are connected by a fourth lateral surface 324a extending along the Y-Y vertical direction. Preferably, the fourth lateral surface 324a extends for a 6 mm long stretch.

Figure 2:
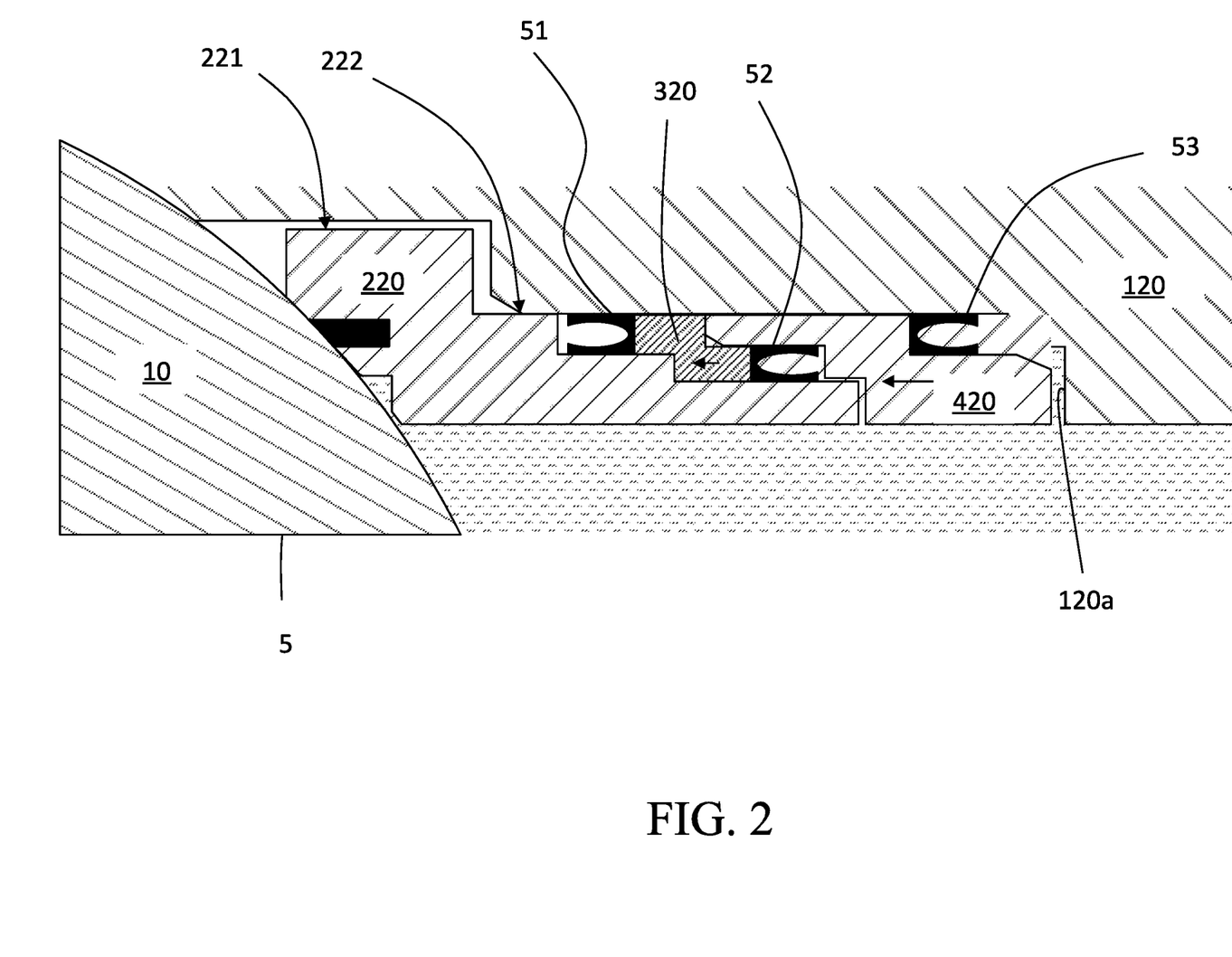
FIGS. 2 and 3 are enlarged views of a portion of the longitudinal sectional view of FIG. 1 wherein the second downstream seat and the intermediate element are movable between a first position and a second position.
Figure 3:
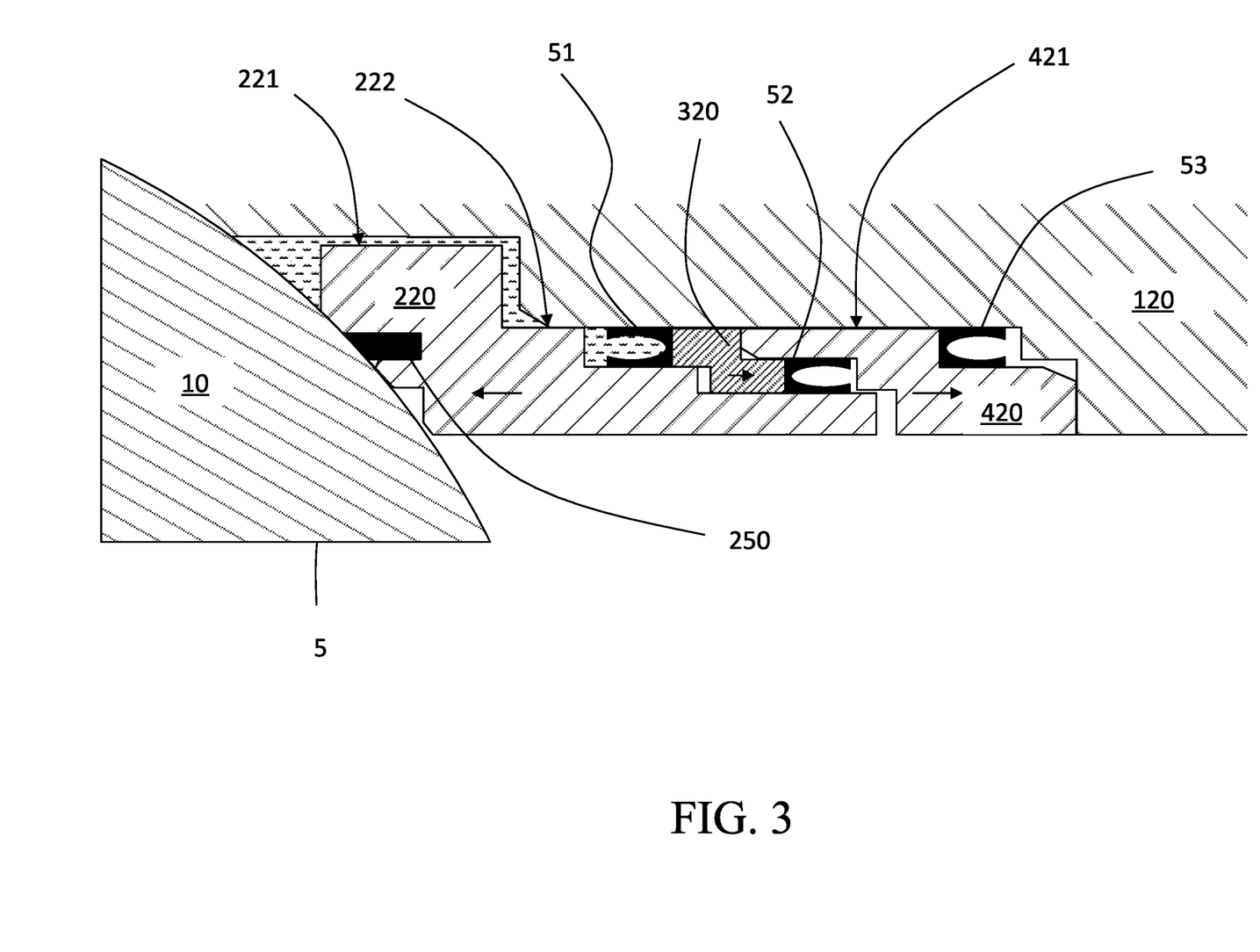

With reference to the FIGS. 2 and 3, the intermediate element 320 is partially keyed onto the first downstream seat 220. This way, the internal surfaces 325,326 of the intermediate element 320 at least partially face onto the external surfaces 223,224 of the first downstream seat 220.

Advantageously, the second external surface 222 of the first downstream seat 220, the second external surface 322 of the intermediate element 320 and the second external surface 421 of the second downstream seat 420 are substantially aligned the one with the other and positioned in a corresponding radial position. Advantageously, the intermediate element 320 has a thickness below ⅔ the thickness of the second downstream seat 420. This way the compactness of the seats 220, 420 is guaranteed, ensuring simplified production and construction of the elements making up the valve.

As shown in the examples of FIGS. 2 and 3, in use, the second downstream seat 420 is partially keyed on the intermediate element 320. This way the third internal surface 427 of the second downstream seat 420 is at least partially facing onto the first external surface 321 of the intermediate element 320.

The second downstream seat 420 is at least partially keyed onto the intermediate element 320 and onto the first downstream seat 220. This way the second internal surface 426 of the second downstream seat 420 is at least partially facing the fourth external surface 224 of the first downstream seat 220 and the third internal surface 427 of the second downstream seat 420 is at least partially facing the first external surface 321 of the intermediate element 320.

Between the first downstream seat 220 and the intermediate element 320 a first seal lip 51 is arranged with its back 51a resting on the second lateral surface 322a of the intermediate element 320. In the same way, between the second downstream seat 420 and the intermediate element 320 a second seal lip 52 is arranged with its back 52a resting on the fourth lateral surface 324a of the intermediate element 320.

Always with reference to the example shown in FIGS. 2 and 3, between the second downstream seat 420 and the downstream conduit 120 a third seal lip 53 is arranged with its back 53a resting on the first lateral surface 421a of the second downstream seat 420.

Preferably, the valve 1 comprises no more than three seal lips 51,52,53 positioned at the downstream conduit 120. This way, the valve can be made in agreement with this invention, keeping production costs low thanks to the presence of a reduced number of elements making up the valve.

Between the first downstream seat 220 and the intermediate element 320 is arranged just one seal lip 51. In the same way, between the intermediate element 320 and the second downstream seat 420 is arranged just one seal lip 52.

Preferably, the first seal lip 51 is positioned in a radial position substantially corresponding to the radial position of the third seal lip 53.

Thanks to the conformation of the downstream conduit 120, of the downstream seats 220,420 and of the intermediate element, to ensure the DPE configuration, no more than three seal lips 53 are needed positioned between the first downstream seat 220 and the downstream conduit 120. This way, the construction of the valve 1 is economically viable and assembly is much easier.

Preferably, the valve 1 has a combined SPE-DPE configuration. In particular, the first upstream seat 210 is in SPE configuration and the first downstream seat 220, the intermediate element 320 and the second downstream seat 420 are in DPE configuration.

As shown in the examples of FIGS. 2 and 3, the seal lips 51,52,53 have a substantially corresponding thickness. Preferably, the thickness substantially corresponds to the thickness of said seal lips 51,52,53.

The gasket 250 is positioned in a radial position substantially corresponding to the radial position of the first seal lip 51 and third seal lip 53.

With reference to the examples of FIGS. 2 and 3, explained below is the operation of the second downstream seat 420 and of the intermediate element 320 depending on whether the pressure is applied from the downstream conduit 120 or from inside the cavity 11 of the rotative ball 10.

As said above, the second downstream seat 420 and the intermediate element 320 are axially moveable between the first downstream seat 220 and the downstream conduit 120. In this case, the second downstream seat 420 and the intermediate element 320 move together between a first position, wherein the intermediate element 320 is abutted against the first downstream seat 220, and a second position, wherein the second downstream seat 420 is abutted against the downstream conduit 120. In particular, between the second position and the first position, the second downstream seat 420 and the intermediate element 320 are moving away from the downstream conduit 120. Even more in particular, the lateral surface 323a of the intermediate element 320 is abutted against the lateral surface 223a of the first downstream seat 220 and the lateral surface 427a of the second downstream seat 420 is abutted against the lateral surface 321a of the intermediate element, while in the second position, the lateral surface 422a of the second downstream seat 420 is abutted against the lateral surface 120a of the downstream conduit 120.

With reference to the example shown in FIG. 2, in use, with valve closed, the pressure of the fluid coming from the downstream conduit 120 acts on the second downstream seat 420 to move it away from the lateral surface 120a of the downstream conduit 120. The second downstream seat 420, in moving towards the rotative ball 10, pushes the intermediate element 320 (in particular, the lateral surface 427a of the second downstream seat 420 acts by pushing on the lateral surface 321a of the intermediate element 320) which in turn acts by pushing on the first downstream seat 220 moving it in abutment on the rotative ball 10 and ensuring the seal.

Thanks to the conformation of the first downstream seat 220, of the second downstream seat 420 and of the intermediate element 320 it is possible to ensure the seat-ball seal inasmuch as the pressure applied on the lateral surfaces 422a and 421a (by means of the third seal lip 53) of the second downstream seat 420 is greater than the pressure acting on the surface 227 of the first downstream seat 220. Consequently, the first downstream seat 220 acts by pushing towards the rotative ball 10 with pressure of the fluid coming from downstream and ensuring its seal. In point of fact, by means of this solution an equivalent operation in SPE configuration is made. It is not therefore necessary to make use of springs that can be coupled with the seats 220,420 and/or with the intermediate element 320 to keep the second downstream seat 420 pushed up against the intermediate element 320 which in turn acts by pushing on the first downstream seat 220.

With reference to the example shown in FIG. 3, in use, with valve closed, the pressure of the fluid coming from inside the cavity 11 of the rotative ball 10 acts on the intermediate element 320 (by means of the first seal lip 51) which pushes the second downstream seat 420 moving it in abutment on the downstream conduit 120. In particular, the pressure acts on the first seal lip 51 in such a way that the lateral surface 321a of the intermediate element 320 pushes the second downstream seat 420 (by means of the lateral surface 427a), moving the latter against the downstream conduit 120.

Because, with pressure coming from inside the cavity 11 of the rotative ball 10, the movement of the intermediate element 320 and of the second downstream seat 420 is kept in the second position, i.e., with the lateral surface 422a of the second downstream seat 420 abutted against the lateral surface 120a of the downstream conduit 120, the pressure can only act in the direction towards the rotative ball 10. In particular, the pressure acting on the lateral surfaces 222a and 221a of the first downstream seat 220 is greater than the pressure acting on the portion of surface represented by the surface 226 up to the point of contact of the gasket 250 with the rotative ball 10. Consequently, thanks to the conformation of the first downstream seat 220, of the second downstream seat 420 and of the intermediate element 320 it is possible to also ensure the seat-ball seal with pressure of the fluid coming from inside the cavity 11 of the rotative ball 10.

The invention claimed is:
1. A valve comprising:
a valve body having an upstream conduit for an inflow of a fluid and a downstream conduit for an outflow of the fluid, said upstream and downstream conduits being substantially aligned along a longitudinal axis,
a rotative ball for controlling fluid passage and having a cavity with an axis perpendicular to a rotating axis of the rotative ball,
a first upstream seat operating in conjunction with said upstream conduit and said rotative ball,
a first downstream seat operating in conjunction with said downstream conduit and said rotative ball, the first downstream seat being step tapered towards the downstream conduit so as to include a plurality of external surfaces extending according to a radial arrangement which is gradually reduced towards the downstream conduit, wherein a first surface of the plurality of external surfaces extends in a radially external position with respect to a second surface of the plurality of external surfaces,
a second downstream seat axially arranged between said first downstream seat and said downstream conduit, the second downstream seat being externally shaped so as to have a first external surface of said second downstream seat, and an intermediate element axially arranged between said first downstream seat and said second downstream seat and axially moveable between said first downstream seat and said second downstream seat, the intermediate element being externally shaped so as to have a first external surface of the intermediate element and a second external surface of the intermediate element extending radially, externally with respect to the first external surface of the intermediate element, wherein the second surface of the first downstream seat, the second external surface of the intermediate element and the first external surface of the second downstream seat are substantially aligned one with another and positioned in a corresponding radial position, wherein between said first downstream seat and said intermediate element a first seal lip is arranged, wherein between said second downstream seat and said intermediate element a second seal lip is arranged, wherein between said second downstream seat and the downstream conduit a third seal lip is arranged, wherein between said first downstream seat and said intermediate element is arranged just one of the first seal lip, wherein between said intermediate element and said second downstream seat is arranged just one of the second seal lip, wherein between said second downstream seat and said downstream conduit is arranged just one of the third seal lip, and wherein:

when pressure of the fluid is coming from inside said cavity, the pressure acts on said intermediate element, which pushes said second downstream seat, moving it in abutment on said downstream conduit, and when pressure of said fluid is coming from the downstream conduit, said pressure acts on said second downstream seat which in turn pushes said intermediate element, and which in turn acts by pushing on said first downstream seat, moving it in abutment on said rotative ball.

2. The valve according to claim 1, wherein said first seal lip is positioned in a first radial position substantially corresponding to a second radial position of said third seal lip.

3. The valve according to claim 1, comprising a gasket at least partially inserted into said first downstream seat and having a thickness of the gasket that substantially corresponds to a thickness of said first, second, and third seal lips.

4. The valve according to claim 3, wherein said gasket is positioned in a first radial position substantially corresponding to a second radial position of said first seal lip and said third seal lip.

5. The valve according to claim 1, wherein the intermediate element is partially keyed onto the first downstream seat.

6. The valve according to claim 1, wherein the second downstream seat is at least partially keyed onto said first downstream seat and onto said intermediate element.

7. The valve according to claim 1, wherein said intermediate element has a thickness below ⅔ of a thickness of said second downstream seat.

8. The valve according to claim 1, wherein said first downstream seat is in a single piston effect configuration.

9. The valve according to claim 1, wherein said first downstream seat, said intermediate element, and said second downstream seat are in a double piston effect configuration.

10. The valve according to claim 1, comprising no more than three seal lips positioned at said downstream conduit.

11. A valve comprising:

a valve body having an upstream conduit for an inflow of a fluid and a downstream conduit for an outflow of the fluid, said upstream and downstream conduits being substantially aligned along a longitudinal axis, a rotative ball for controlling fluid passage and having a cavity with an axis perpendicular to a rotating axis of the rotative ball, a first upstream seat operating in conjunction with said upstream conduit and said rotative ball, a first downstream seat operating in conjunction with said downstream conduit and said rotative ball, the first downstream seat being step tapered towards the downstream conduit so as to include a plurality of external surfaces extending according to a radial arrangement which is gradually reduced towards the downstream conduit, wherein a first surface of the plurality of external surfaces extends in a radially external position with respect to a second surface of the plurality of external surfaces, a second downstream seat axially arranged between said first downstream seat and said downstream conduit, the second downstream seat being externally shaped so as to have a first external surface of said second downstream seat, and an intermediate element axially arranged between said first downstream seat and said second downstream seat and axially moveable between said first downstream seat and said second downstream seat, the intermediate element being externally shaped so as to have a first external surface of the intermediate element and a second external surface of the intermediate element extending radially, externally with respect to the first external surface of the intermediate element, wherein the second surface of the first downstream seat, the second external surface of the intermediate element and the first external surface of the second downstream seat are aligned one with another and positioned in a corresponding radial position, wherein the valve comprises no more than three seal lips positioned at the downstream conduit, wherein between said first downstream seat and said intermediate element a first seal lip is arranged, wherein between said second downstream seat and said intermediate element a second seal lip is arranged, wherein between said second downstream seat and the downstream conduit a third seal lip is arranged, wherein between said first downstream seat and said intermediate element is arranged just one of the first seal lip, wherein between said intermediate element and said second downstream seat is arranged just one of the second seal lip, wherein between said second downstream seat and said downstream conduit is arranged just one of the third seal lip, and wherein:

when pressure of the fluid is coming from inside said cavity, the pressure acts on said intermediate element, which pushes said second downstream seat, moving it in abutment on said downstream conduit, and when pressure of said fluid is coming from the downstream conduit, said pressure acts on said second downstream seat which in turn pushes said intermediate element, and which in turn acts by pushing on said first downstream seat, moving it in abutment on said rotative ball.

12. A valve comprising:
a valve body having an upstream conduit for an inflow of a fluid and a downstream conduit for an outflow of the fluid, said upstream and downstream conduits being substantially aligned along a longitudinal axis,
a rotative ball for controlling fluid passage and having a cavity with an axis perpendicular to a rotating axis of the rotative ball,
a first upstream seat operating in conjunction with said upstream conduit and said rotative ball,
a first downstream seat operating in conjunction with said downstream conduit and said rotative ball, the first downstream seat being step tapered towards the downstream conduit so as to include a plurality of external surfaces extending according to a radial arrangement which is gradually reduced towards the downstream conduit, wherein a first surface of the plurality of external surfaces extends in a radially external position with respect to a second surface of the plurality of external surfaces,
a second downstream seat axially arranged between said first downstream seat and said downstream conduit, the second downstream seat being externally shaped so as to have a first external surface of said second downstream seat, a first internal surface, a second internal surface, and a third internal surface, the first internal surface being extended in a radially internal position with respect to the second internal surface, the third internal surface being extended radially externally with respect to the second internal surface, and
an intermediate element axially arranged between said first downstream seat and said second downstream seat and axially moveable between said first downstream seat and said second downstream seat, the intermediate element being externally shaped so as to have a first external surface of the intermediate element and a second external surface of the intermediate element extending radially, externally with respect to the first external surface of the intermediate element,
wherein the second surface of the first downstream seat, the second external surface of the intermediate element and the first external surface of the second downstream seat are aligned one with another and positioned in a corresponding radial position,
wherein the second downstream seat is partially keyed on the intermediate element, so that the third internal surface of the second downstream seat is at least partially facing onto the first external surface of the intermediate element,
wherein the valve comprises no more than three seal lips positioned at the downstream conduit,
wherein between said first downstream seat and said intermediate element a first seal lip is arranged,
wherein between said second downstream seat and said intermediate element a second seal lip is arranged,
wherein between said second downstream seat and the downstream conduit a third seal lip is arranged,
wherein between said first downstream seat and said intermediate element is arranged just one of the first seal lip,
wherein between said intermediate element and said second downstream seat is arranged just one of the second seal lip,
wherein between said second downstream seat and said downstream conduit is arranged just one of the third seal lip, and
wherein:
when pressure of the fluid is coming from inside said cavity, the pressure acts on said intermediate element, which pushes said second downstream seat, moving it in abutment on said downstream conduit, and
when pressure of said fluid is coming from the downstream conduit, said pressure acts on said second downstream seat which in turn pushes said intermediate element, and which in turn acts by pushing on said first downstream seat, moving it in abutment on said rotative ball.

* * * * *